United States Patent [19]

Suman et al.

[11] Patent Number: 5,455,716
[45] Date of Patent: Oct. 3, 1995

[54] VEHICLE MIRROR WITH ELECTRICAL ACCESSORIES

[75] Inventors: Michael J. Suman; Sheldon J. Watjer, both of Holland, Mich.

[73] Assignee: Prince Corporation, Holland, Mich.

[21] Appl. No.: 989,895

[22] Filed: Dec. 10, 1992

Related U.S. Application Data

[63] Continuation of Ser. No. 685,880, Apr. 15, 1991, abandoned, which is a continuation-in-part of Ser. No. 567,390, Aug. 14, 1990.

[51] Int. Cl.$^6$ .................... G02B 7/18; B60R 1/04
[52] U.S. Cl. .................... 359/838; 359/872; 248/549; 248/479; 248/481; 248/900
[58] Field of Search .................... 359/838, 871, 359/872; 248/548, 549, 550, 477, 479, 481, 900

[56] References Cited

U.S. PATENT DOCUMENTS

| | | |
|---|---|---|
| Re. 32,576 | 1/1988 | Pastore . |
| 1,522,241 | 7/1923 | Hennessey . |
| 2,706,307 | 1/1953 | Anderson . |
| 3,174,576 | 7/1960 | Woofter et al. . |
| 3,196,440 | 11/1962 | Weinstein . |
| 3,270,831 | 7/1960 | Woofter et al. . |
| 3,425,657 | 2/1967 | Doyle .................... 248/481 |
| 3,436,049 | 5/1967 | De Claire . |
| 3,471,115 | 9/1967 | Corbin . |
| 3,575,375 | 4/1971 | Strem, Jr. . |
| 3,590,136 | 6/1971 | Kunishi . |
| 3,599,926 | 8/1971 | Takahashi . |
| 3,635,305 | 1/1972 | Kunishi et al. . |
| 3,703,270 | 11/1972 | Tomlin . |
| 3,703,714 | 11/1972 | Andrews . |
| 3,707,697 | 12/1972 | Izumi . |
| 3,723,967 | 3/1973 | Atkins et al. . |
| 3,891,980 | 6/1975 | Lewis et al. . |
| 3,969,709 | 7/1976 | Isaacs et al. . |
| 3,978,478 | 8/1976 | Schmitz . |
| 4,012,022 | 3/1977 | Tomita .................... 248/475 |
| 4,100,372 | 7/1978 | Hypolite . |
| 4,133,405 | 1/1979 | Turek . |
| 4,137,985 | 2/1979 | Winchell . |
| 4,151,507 | 4/1979 | Willis . |
| 4,153,127 | 5/1979 | Klink et al. . |
| 4,159,466 | 6/1979 | Mengel . |
| 4,205,325 | 5/1980 | Haygood et al. . |
| 4,240,516 | 12/1980 | Henderson et al. . |
| 4,241,870 | 12/1980 | Marcus . |
| 4,254,931 | 3/1982 | Aikens et al. . |
| 4,323,024 | 7/1982 | Rossi . |
| 4,333,090 | 6/1982 | Hirsch . |
| 4,372,410 | 2/1983 | Loken et al. . |
| 4,383,242 | 5/1983 | Sassover et al. . |
| 4,413,368 | 3/1983 | Route et al. . |
| 4,421,190 | 12/1983 | Martinson et al. . |
| 4,424,631 | 1/1984 | Franks . |

(List continued on next page.)

FOREIGN PATENT DOCUMENTS

| | | | |
|---|---|---|---|
| 1480386 | 7/1969 | Germany | .................... 250/350 |
| 3001906 | 7/1981 | Germany . | |
| 63-219440 | 9/1988 | Japan . | |
| 1123290 | 8/1968 | United Kingdom . | |
| 1326740 | 8/1973 | United Kingdom . | |
| 2051442 | 3/1980 | United Kingdom . | |

*Primary Examiner*—Ricky D. Shafer
*Attorney, Agent, or Firm*—Price Heneveld Cooper; DeWitt & Litton

[57] ABSTRACT

A mounting assembly for a vehicle rearview mirror has breakaway capability and includes a base for attachment to an interior portion of a vehicle and a support for releasable attachment to the base. A rearview mirror assembly is mounted on an end of said support. The support and base include removable electrical connectors for removably, electrically connecting any one of a variety of selectable electrical circuits in the rearview mirror assembly to wiring in the vehicle roof structure. A spring clip is provided to releasably connect the support member to the base such that a predetermined level of force is required to cause the support to release from the base and thereby permit the rearview mirror to break away.

8 Claims, 6 Drawing Sheets

U.S. PATENT DOCUMENTS

| | | |
|---|---|---|
| 4,447,808 | 5/1984 | Marcus . |
| 4,463,340 | 7/1984 | Adkins et al. . |
| 4,482,947 | 11/1984 | Zato et al. . |
| 4,499,451 | 2/1985 | Suzuki et al. . |
| 4,505,054 | 3/1985 | Clark et al. . |
| 4,535,333 | 8/1985 | Twardowski . |
| 4,566,034 | 1/1986 | Harger et al. . |
| 4,573,046 | 2/1986 | Pinnow . |
| 4,588,267 | 5/1986 | Pastore . |
| 4,602,256 | 7/1986 | Kago et al. . |
| 4,620,268 | 10/1986 | Ferenc . |
| 4,623,887 | 11/1986 | Welles II . |
| 4,626,086 | 12/1986 | Ohyama . |
| 4,626,848 | 12/1986 | Ehlers . |
| 4,630,904 | 12/1986 | Pastore . |
| 4,665,397 | 5/1987 | Pinnow . |
| 4,668,059 | 5/1987 | Ohyama . |
| 4,670,746 | 6/1987 | Taniguchi et al. . |
| 4,677,381 | 6/1987 | Geerlings . |
| 4,688,036 | 8/1987 | Hirano et al. . |
| 4,703,359 | 10/1987 | Rumbolt et al. . |
| 4,709,412 | 11/1987 | Seymour et al. . |
| 4,711,421 | 12/1987 | Mittelhauser . |
| 4,712,105 | 12/1987 | Kohler . |
| 4,719,460 | 1/1988 | Takeuchi et al. . |
| 4,723,121 | 2/1988 | van den Boom et al. . |
| 4,737,784 | 4/1988 | Hirano . |
| 4,754,255 | 6/1988 | Sanders et al. . |
| 4,761,645 | 8/1988 | Mochida . |
| 4,794,268 | 12/1988 | Nakano et al. . |
| 4,818,010 | 4/1989 | Dillon . |
| 4,835,533 | 5/1989 | Akutsu . |
| 4,844,533 | 7/1989 | Dowd et al. . |
| 4,856,072 | 8/1989 | Schneider et al. . |
| 4,868,559 | 9/1989 | Pinnow . |
| 4,869,670 | 9/1989 | Ueda et al. . |
| 4,881,148 | 11/1989 | Lambropoulos et al. . |
| 4,882,565 | 11/1989 | Gallmeyer . |
| 4,883,349 | 11/1989 | Mittelhauser ............... 359/871 |
| 4,899,975 | 2/1990 | Suman ............... 248/481 |
| 4,904,074 | 2/1990 | Gilbert ............... 350/635 |
| 4,909,470 | 3/1990 | Clark . |
| 4,930,742 | 6/1990 | Schofield et al. ............... 359/871 |
| 5,016,996 | 5/1991 | Ueno ............... 359/838 |

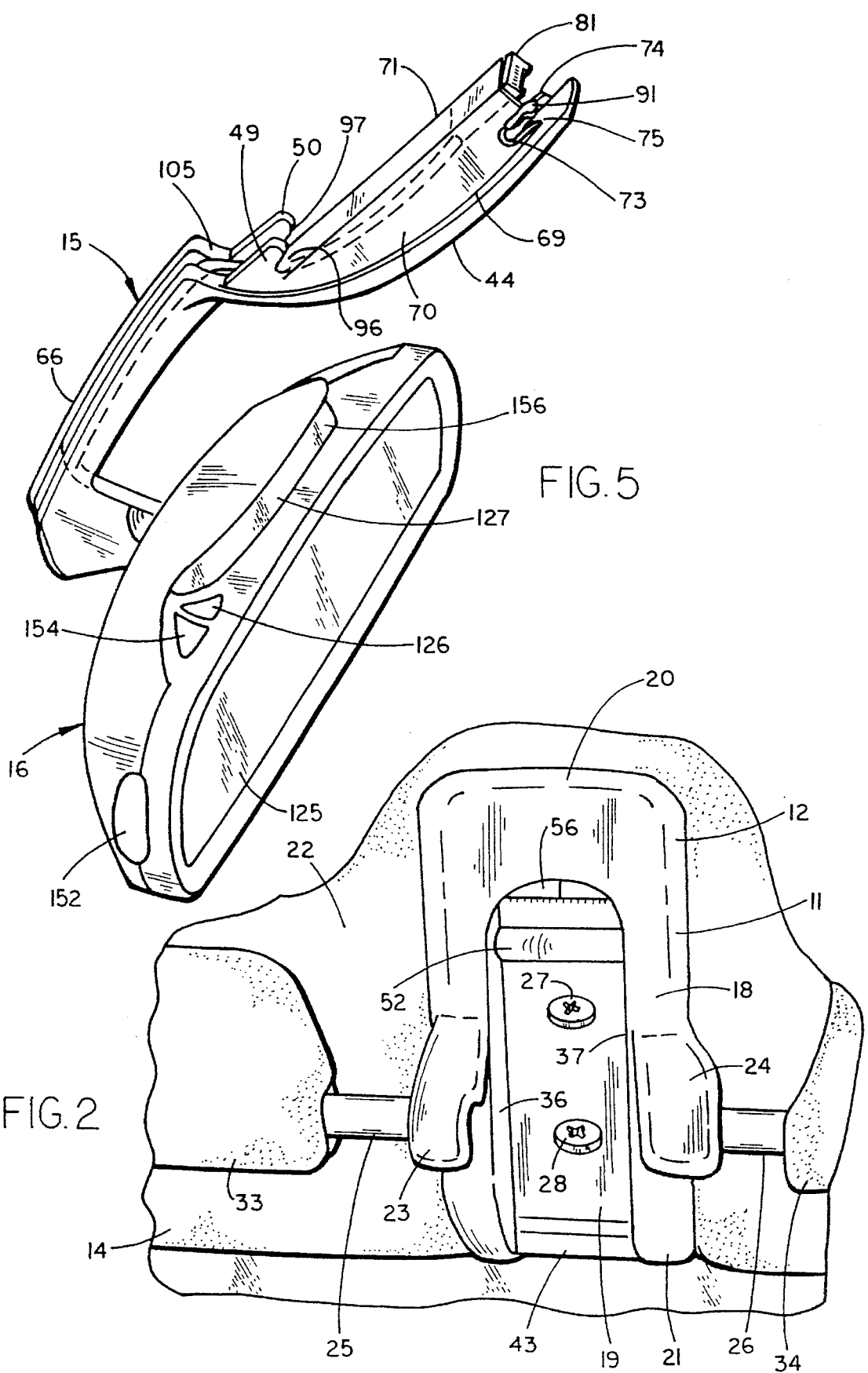

5,455,716

VEHICLE MIRROR WITH ELECTRICAL ACCESSORIES

CROSS-REFERENCE TO RELATED APPLICATION

This is a continuation of copending application Ser. No. 07/685,880, filed Apr. 15, 1992, now abandoned, which is a continuation-in-part of application Ser. No. 07/567,390 entitled ELECTRICAL CONTROL SYSTEM FOR VEHICLE OPTIONS filed on Aug. 14, 1990, the disclosures of which are incorporated herein by reference.

BACKGROUND OF THE INVENTION

The present invention pertains to a vehicular mounting assembly for rearview mirrors and in particular to a mounting assembly having a breakaway capacity for rearview mirrors having electrical accessories.

Modern vehicles are manufactured with a rearview mirror assembly attached to the vehicle roof structure or windshield. Such assemblies typically include a control mechanism for adjusting the amount of light reflected to the driver. Rearview mirror assemblies may also include electrical accessories such as a clock; map lamps; an electric reflectivity control; vehicle warning indicators; and garage door openers. Examples of rearview mirror assemblies including electrical accessories are disclosed in U.S. Pat. No. 4,447,808 entitled REARVIEW MIRROR TRANSMITTER ASSEMBLY issued to Marcus on May 8, 1984; and U.S. Pat. No. 4,425,717 entitled VEHICLE MAGNETIC SENSOR issued Jan. 17, 1984 to Marcus. These and other mirror assemblies include electrical circuitry wired directly to the vehicle's electrical system typically through a wire harness. However, they do not provide a modular mounting construction allowing the flexibility of mounting a variety of different mirror assemblies to a base.

Breakaway rearview mirrors are Utilized to reduce the severity of injury for an individual in the event of an accident. In the past, one approach has been to attach the mirror to a vehicle through the use of a frangible element. With this construction, a new mounting assembly must be purchased and installed with every instance that the mirror is broken away. To overcome the deficiencies and problems of using a frangible mounting assembly, some mounts include spring bias mechanisms or resilient support members which act to bend or give way but do not fracture upon impact. These arrangements provide a less secure and steady mounting of the mirror when placed in an operative position. None of these mounting arrangements include an electrical connection between electrical circuitry in a rearview mirror and the vehicle's electrical system.

A particularly advantageous breakaway mirror assembly which overcomes many of the disadvantages of the prior art breakaway rearview mirrors is disclosed in U.S. Pat. No. 4,909,470 entitled OVERHEAD CONSOLE WITH BREAKAWAY MOUNT issued to Clark on Mar. 20, 1989. Although this construction provides a mechanically superior mounting assembly, it does not provide an electrical connection between the mirror and the vehicle's electrical system.

SUMMARY OF THE INVENTION

In accordance with the present invention, a unique vehicular rearview mirror mounting assembly is provided including electrical connectors on the mirror support stem and the base which are cooperatively configured to matingly engage in an operative position to provide an electrical connection between electrical accessories in the rearview mirror and the vehicle's wiring system. In one embodiment of the invention, a rearview mirror mounting assembly includes mechanical connectors which securely and steadily hold the mirror in an operative position and yet release the mirror upon impact without resulting structural damage.

By utilizing the mounting assembly of the present invention, rearview mirror assemblies having different electrical accessories are removably interconnected with the vehicle's electrical system by cooperative engagement with a base attached to the interior of the vehicle. Rearview mirror assemblies having different electrical accessories thus can be interchangeably attached to the vehicle and an auto mechanic or salesperson at an auto dealership may readily change the rearview mirror attached to the vehicle. A purchaser may thus select or change to desired rearview mirror accessories for a particular vehicle after the vehicle is manufactured or even purchased.

The mounting assembly according to the present invention holds the mirror in a steady and secure manner during use and yet breaks away without any resulting structural damage to the rearview mirror mounting assembly when struck by a predetermined force. The assembly includes a minimal number of parts which increases the manufacturing efficiency and reduces the cost of providing rearview mirrors having different options in different vehicles as well as providing a cost efficient breakaway mirror assembly. The elements of the breakaway mirror mounting assembly are easily and quickly reassembled without the need for tools or special training.

These and other features, objects and advantages of the present invention, will become apparent upon reading the following description thereof together with reference to the accompanying drawings in which:

BRIEF DESCRIPTION OF THE DRAWINGS

FIG. 2 is an enlarged perspective view of the base of the system of the present invention shown in FIG. 1 shown attached to the vehicle roof;

FIG. 5 is an upper perspective view of the mirror assembly and mirror support shown in FIGS. 1, 3, and 4;

DETAILED DESCRIPTION OF THE PREFERRED EMBODIMENTS

Figure 1:
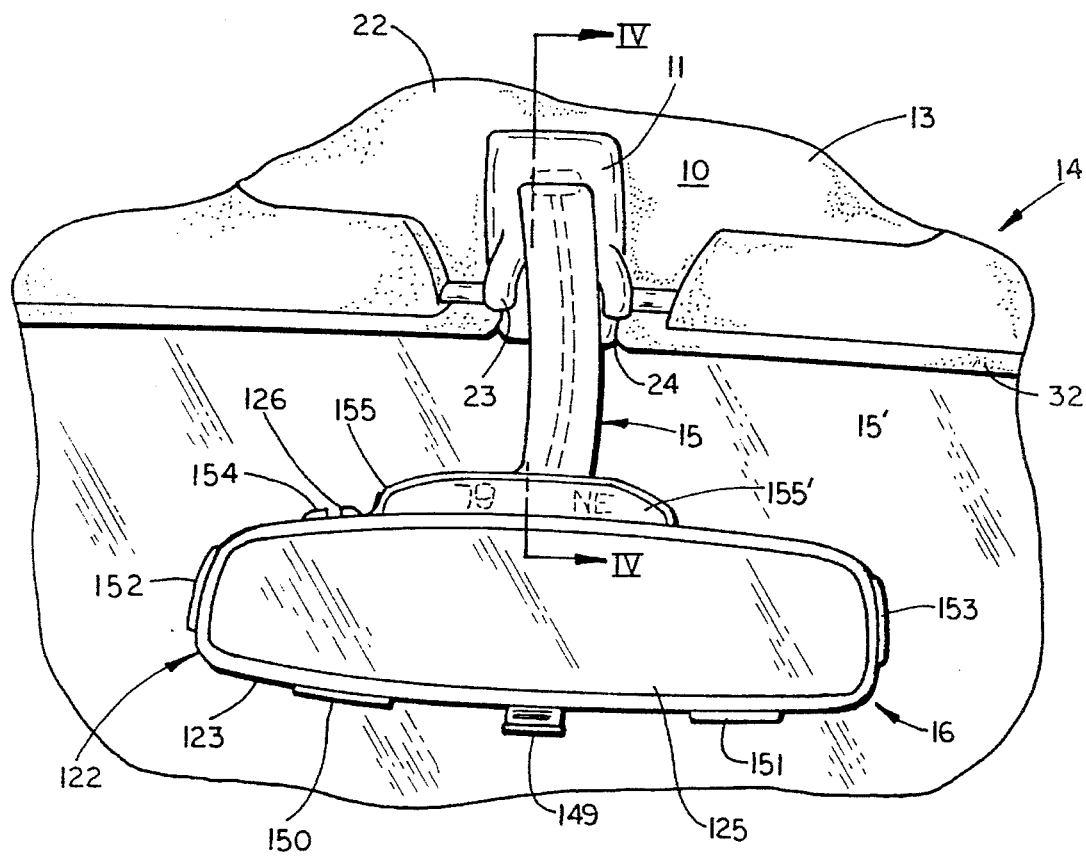
FIG. 1 is a perspective view of a rearview mirror and mounting assembly of the present invention attached to the interior of the vehicle.

Referring initially to FIG. 1, there is shown a mirror mounting assembly 10 which includes a base 11 adapted to be attached to the roof 13 structure of a vehicle 14. Mounted to the base 11 is a mirror support 15 for the breakaway mounting of a rearview mirror assembly 16 to the base 11. Mirror assembly 16 includes electrical accessories electrically connected to the vehicle electrical system through base 11. Preferably, base 11 is integrally molded of a rigid polymeric material such as a polycarbonate. Mirror support 15 is formed from a metal such as cast aluminum if the stem has a small cross-sectional area or if it is relatively long, or mirror support 15 is formed from a plastic such as polycarbonate if it has a larger cross-sectional area or if it is relatively short.

Figure 4:
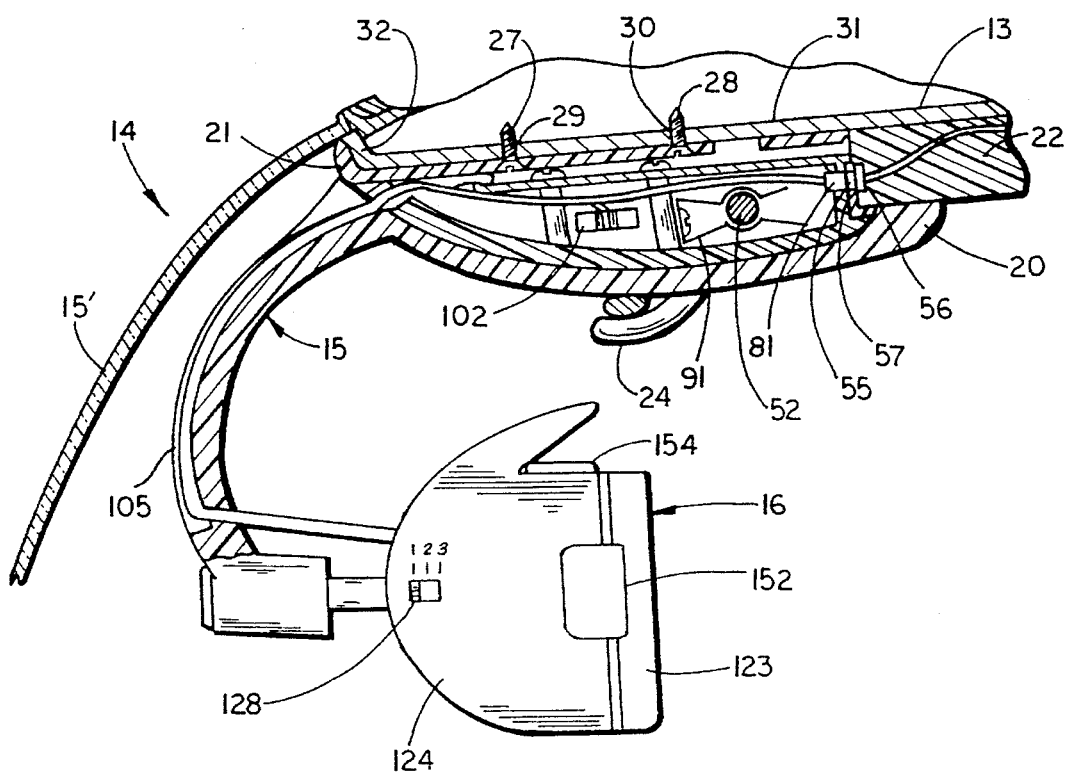
FIG. 4 is a left side elevational and partial cross-sectional view of the mounting assembly taken along section line IV—IV of FIG. 1.
Figure 3:
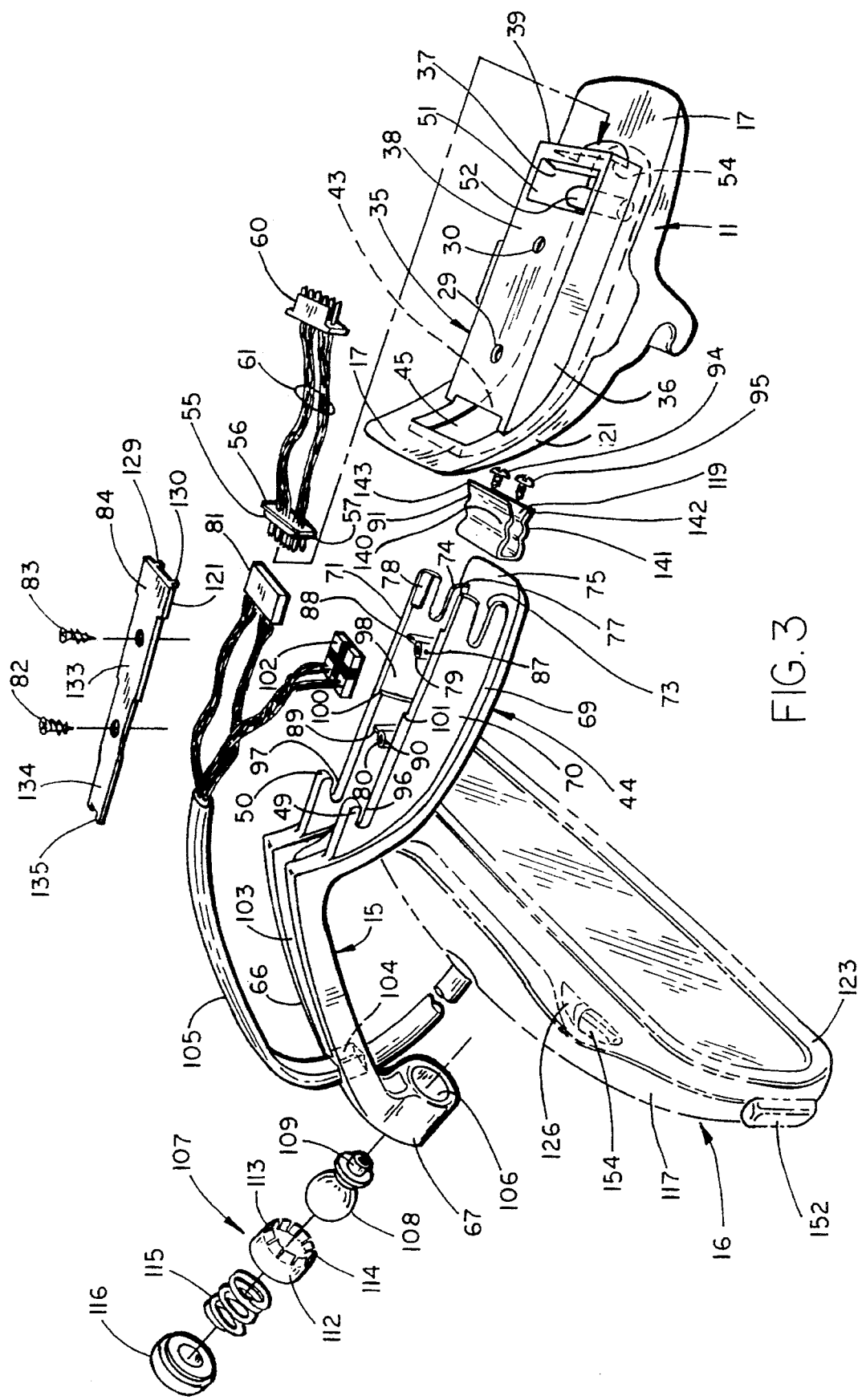
FIG. 3 is an exploded perspective view of the structure shown in FIGS. 1 and 2.

Base 11, is shown in detail in FIGS. 2–4, and is a generally rectangular member having an upper surface 17 (FIG. 3), a lower surface 18 (FIG. 2), and a central pocket 19 formed in lower surface 18. An end 20 and an end 21 of base 11 are preferably curved and shaped to aesthetically conform to the contours of the vehicle headliner 22. When assembled in vehicle 14, upper surface 17 faces headliner 22 and is unseen by a viewer inside vehicle 14. Base 11 includes sockets 23 and 24 at opposite sides which receive visor posts 25 and 26 to support the inward ends of visors 33 and 34.

To effect attachment of base 11 to roof 13, a pair of threaded fasteners 27 and 28 extend through a pair of spaced apart apertures 29 and 30 in base 11 and into roof support element 31 (FIG. 4). To facilitate the positioning of base 11 in its proper location to more effectively resist any undesirable twisting motion of the base, upper surface 17 is contoured to conform to the curve of window header support structure 31 along the vehicle windshield molding 32 above windshield 15'. Thus end 21 of surface 17 extends in an vertical arc of approximately 90° as best seen in FIG. 4. The outside surface of the walls of pocket 19 abut with a rectangular cutout in vehicle headliner 22.

Pocket 19 is defined by a peripheral boundary wall 35 defined by a pair of opposing sidewalls 36 and 37 (FIGS. 2 and 3), a top wall 38 and a rear wall 39. A front opening 43 of central pocket 19 is open to receive a base connector portion 44 of mirror support 15. An aperture 45 passes through base 11 at end 21 where surface 17 extends above planar top wall 38. Aperture 45 facilitates reception of fingers 49 and 50 of base connector 44 of mirror support 15. Top wall 38 includes a rectangular aperture 51 formed above a cylinder 52 (FIG. 2) which provides a passage for a mold used to manufacture cylinder 52 integrally with walls 36 and 37. Cylinder 52 extends between opposing sidewalls 36 and 37 in pocket 19 and is utilized to attach mirror support 15 in base 11, as described below. An aperture 54 formed in rear wall 39 is configured to receive a base connector 55 of a male electrical connector 56. An integrally formed circumscribing ledge 57 extends around connector 55 and is formed to abut with the outside surface of rear wall 39 adjacent aperture 54. The male connector 56 is attached to wall 39 of base 11 by an adhesive. Alternatively, threaded fasteners, or integrally molded clips or tabs on base 11 or connector 56, may be utilized to attach the male connector 56 to base 11.

Figure 6:
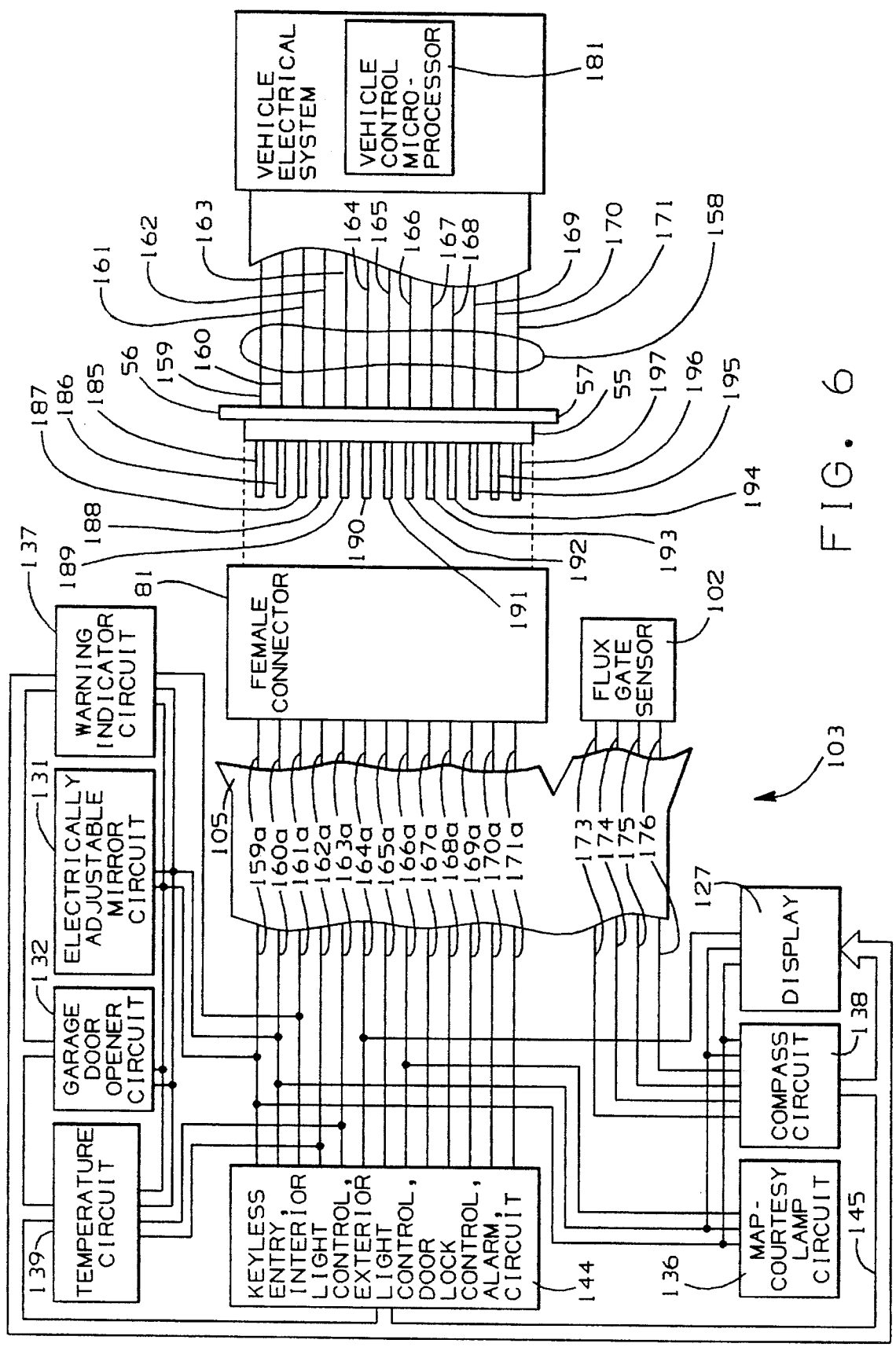
FIG. 6 is an electrical circuit diagram, partly in block form, of a thirteen-wire electrical connector employed in one embodiment of the present invention.
Figure 7:
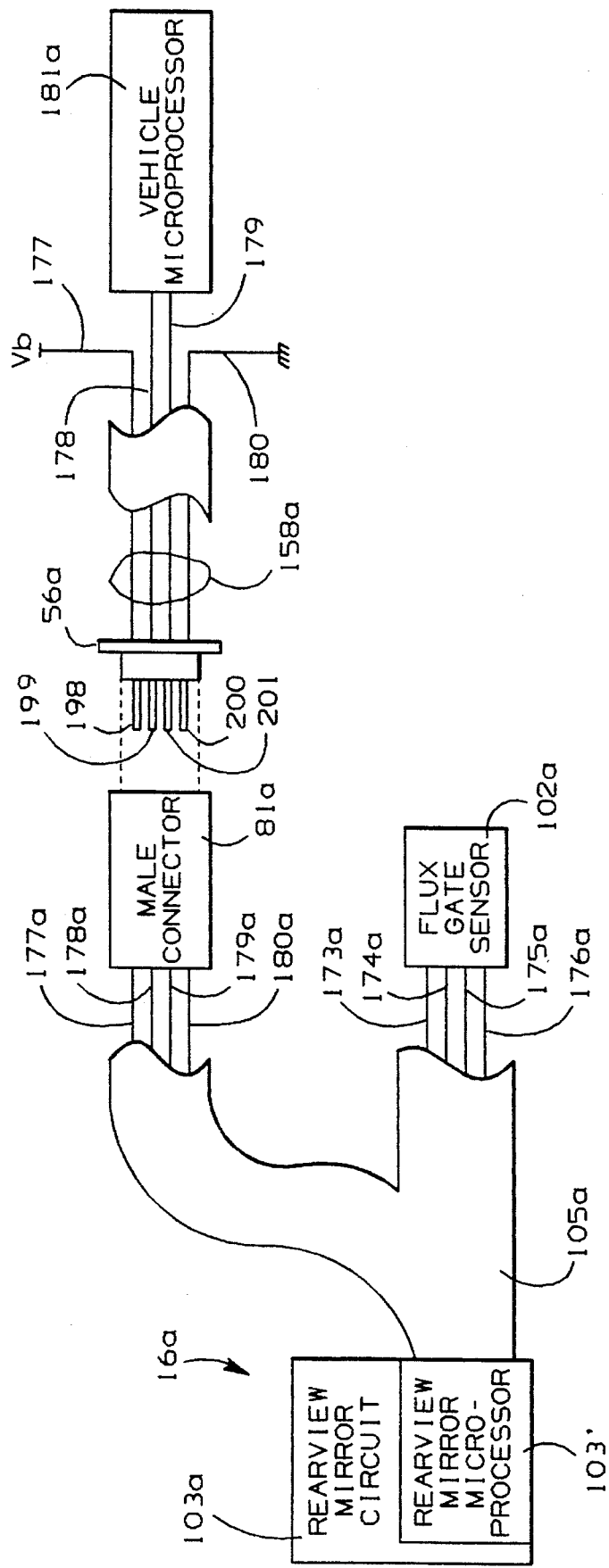
FIG. 7 is an electrical circuit diagram partly in block form of a four-wire electrical connector employed in another embodiment of the present invention.

Electrical connector 56 in central pocket 19 is electrically coupled to the electrical system of vehicle 13 to supply control signals to and from mirror assembly 16 and to supply power to mirror assembly 16 by a wire harness 61. Connector 60 is utilized to electrically connect male plug 56 to the vehicle electrical system by mating with a complementary multiplex bus connector or electrical wiring connector (not shown) in the roof of vehicle 13. Connector 56 may alternatively be attached to a wire harness mounted in the roof 13 of vehicle 14 which is electrically connected to the vehicle control system as illustrated in FIGS. 6 and 7. The multiplex signal wiring harness 158a or the electrical wiring harness 158 are mounted in roof 13.

Mirror support 15 includes base connector 44, a stem portion 66 (FIGS. 3 and 5), and a rearview mirror assembly connector 67. The base connector 44 includes an arcuate wall 69 and opposing sidewalls 70 and 71 projecting orthogonally from wall 69. Wall 69 abuts with surface 18 of base 11 when the support is attached to base 11. Each of the sidewalls 70 and 71 includes a slot 73 and 74 respectively extending therein from an end 75 for receiving mounting cylinder 52. Each of sidewalls 70 and 71 further includes a recess 77 and 78 respectively which extend in parallel with slots 73 and 74 respectively for receiving a female electrical connector 81. A pair of threaded cylinders 79 and 80 are provided between opposing sidewalls 70 and 71 for receiving threaded fasteners 82 and 83 utilized to attach cover plate 84 on base connector 44. Each of the internally threaded cylinders 79 and 80 include cross wall sections 87 and 88 and 89 and 90 integrally molded with cylinders 79 and 80 and walls 70 and 71. The cross walls 87–90 support cylinders 79 and 80 and prevent twisting of the cylinders when fasteners 82 and 83 are inserted therein. A resilient clip 91 is attached to cross walls 87 and 88 by threaded fasteners 94 and 95. Sidewalls 70 and 71 further include fingers 49 and 50 respectively which project in parallel with walls 70 and 71 and form slots 96 and 97 which receive top wall 38 of base 11 when base connector 44, is attached to base 11.

Base connector 44 also includes a pocket 98 between cylinders 79 and 80; sidewalls 70 and 71; and corners 100 and 101 for receiving a fluxgate sensor 102. Electrical circuitry 103 (FIGS. 6–8) in mirror assembly 16 is electrically coupled by cable 105 and female connector 81 in mirror support 15 to male connector 56 in base 11 when mirror support 15 is operatively attached to base 11. The stem 66 of mirror support 15 extends between base connector 44 and mirror connector 67. Stem 66 includes a channel 103 formed approximately centrally and extending from a cable passage 104 to base connector 44. Cable passage 104 is generally rectangular to receive cable 105 which electrically interconnects female connector 81 and fluxgate sensor 102 with the electrical circuitry 103 in mirror assembly 16.

Rearview mirror assembly connector 67 includes a generally cylindrical central passage 106 which receives universal connector assembly 107 which facilitates pivotal connection of mirror assembly 16 to support 15. The universal connector assembly includes a ball 108 having an integral outward projecting internally threaded end 109 for receiving a threaded fastener (not shown) which connects ball 108 to mirror assembly 16. The universal connector assembly further includes a generally cylindrical socket 112 having inwardly extending fingers 113 which circumscribe an opening 114 on one side of the socket 112. The fingers prevent passage of ball 108 through opening 114. A spring 115 is positioned between ball 108 and cap 116 to bias ball 108 against fingers 113 of socket 112 when the universal connector 107 is assembled in central cylindrical passage 106. The bias from spring 115 allows the position of mirror assembly 16 to be adjusted to accommodate different drivers and prevents movement of the mirror assembly during normal vehicle operation.

To assemble rearview mirror assembly 16 and mirror connector portion 67, internally threaded cylinder 109 of ball 108 is inserted through opening 114 formed by circumscribing inwardly projecting fingers 113. The ball is then attached to mirror assembly 16 by a threaded fastener (not shown) which projects outwardly from the back surface 117 of mirror assembly 16. Spring 115 is inserted into cylinder 106 and positioned against ball 108. Cap 116 is affixed to mechanical mirror connector 67 using an adhesive, although a threaded fastener or integrally molded clips on cap 116 could be utilized to attach cap 116 to mirror support 15. Cable 105 is inserted through rectangular passage 104 and positioned in channel 103 extending through stem 66.

To assemble base connector 44, fluxgate sensor 102 is inserted into pocket 98, female connector 81 is inserted into recesses 77 and 78 in sidewalls 70 and 71, and clip 91 is affixed to cross walls 87 and 88 using threaded fasteners 94 and 95 with opening 119 of clip aligned with slots 96 and 97 in sidewalls 70 and 71. Cover plate 84 is attached to base connector 44 by fasteners 82 and 83 which secure fluxgate sensor 102 and female connector 81 within base connector 44. A wide end 121 of plate 84 is inserted into recesses 77 and 78 above female connector 26. End 121 of plate 84 includes a pair of projecting pins 129 and 130 which engage female connector 81 to hold it in recesses 77 and 78 when mirror support 15 is disconnected from base 11. A middle section 133 of plate 84 is received in base connector 65 between walls 70 and 71 over the pocket 98 and fluxgate sensor 102 to secure fluxgate sensor 102 in the base connector 44. A narrow section 134 of plate 84 includes recess 135 which provides a passage by which cable 105 enters the chamber formed by walls 69–71 and plate 84.

Clip 91 is dimensioned to removably engage cylinder 52 in pocket 19 of base 11 to provide breakaway mounting of the rearview mirror to the vehicle. The clip is preferably a spring steel clip which is resilient enough to slide over and engage cylinder 52 and to hold cylinder 52 when mirror assembly 16 is adjusted by vehicle operators. Opening 119 of clip 91 is formed between arms 142 and 143 which include centrals indentations 140 and 141 adapted to engage cylinder 52 as illustrated in FIG. 4 when mirror support 15 is operatively assembled to base 11. Clip 91 is sufficiently rigid to prevent longitudinal movement of mirror support 15 out of engagement with base 11 when the position of mirror assembly 16 is adjusted or control buttons on the mirror are manipulated to control electrical accessories thereon, and sufficiently rigid to disengage cylinder 52 when a forwardly directed force is exerted on mirror assembly 16 or mirror support 15 in the event of an accident.

Referring to FIGS. 1, 4 and 5, rearview mirror assembly 16 includes a housing 122 formed by a bezel 123 and rear housing 124. The mirror assembly also includes an information display 155, above the housing, and a mirror 125. The information display 155 includes a display source 156 (FIG. 5) connected to display circuit 127 and a reflective display surface 155' for providing information to a vehicle operator. Switches 152 and 153 manually actuate right and left map lamps 150 and 151 located in the bottom wall of bezel 123 and rear housing 124. A switch 154 is an electrically adjustable mirror (EAM) train switch which controls an internal control circuit 131 (FIG. 6) to train the mirror according to current light conditions. A switch 126 is a garage door opener (GDO) switch which selectively controls circuit 130 to either transmit an RF signal for activating a garage door opening mechanism (not shown), or to control circuit 130 to receive and store the control signal from a remote control transmitter (not shown) which is typically purchased with the garage door opening mechanism. A three-way switch 128 (FIG. 4) allows the vehicle operator to select one of three different control signals for actuating three different remotely controlled mechanisms using switch 126. Mirror assembly 16, includes circuit 103 mounted on a printed circuit board (not shown) in housing 122. Mirror assembly 16 is described in greater detail in co-pending application Ser. No. 567,390 entitled ELECTRICAL CONTROL SYSTEM FOR VEHICLE OPTIONS filed Aug. 14, 1990, the disclosure of which is incorporated herein by reference.

Referring now to FIG. 6, a thirteen conductor wire harness 158 mounted in the roof structure 13 of vehicle 14 includes conductors 159–171, and a male connector 56. The thirteen conductors in harness 158 include eight input signal conductors including a battery conductor 159; a ground conductor 160; an ignition conductor 161; a temperature 162 conductor connected to a thermometer for the outside temperature and a conductor 163 connected to a thermometer for sensing the internal temperature of the vehicle (not shown); an instrument panel dimming conductor 164; a headlight on-off conductor 165; and a courtesy conductor 166. The thirteen wires also include five output conductors 167–171 from the rearview mirror microprocessor (not shown) in rearview mirror circuit 103; a courtesy conductor 167; a trunk release conductor 168; a driver door unlock conductor 169; a lock all doors conductor 170; and an unlock all doors conductor 171. The above indicated signal conductors are multiplexed to provide additional signaling between a microprocessor (not shown) in circuit 103 and the vehicle control microprocessor 181 in the vehicle electrical system so that all the necessary control signals for the electrical accessories are provided by the thirteen conductors.

Circuit 103 illustrated in FIG. 6 is mounted on a circuit board within mirror assembly 16. Assembly 16, illustrated in FIGS. 1, 4 and 5, includes electrical accessories electrically connected to the vehicle's electrical system by electrical connectors 56, 81 and cable 105. Cable 105 includes thirteen conductors 159a–171a connected to female plug 81. When male plug 56 is connected to female plug 81, leads 159a–171a are connected to leads 159–171 in wire harness 158.

The accessories are illustrated in FIG. 6 as separate blocks, although most preferably, a single microprocessor is used for all the accessories in the circuit 103. A display 155 (FIG. 5) is mounted in the mirror housing 122 above the mirror 125. The display circuit 127 (FIG. 6) including display source 155 is connected by a signal bus 145 to: a warning circuit 137 providing visual warnings such as excessive oil pressure, excess vehicle temperature, alternator actuated, seat belts unfastened, emergency brake, and battery indicator; an electronic compass circuit 138 which provides vehicle heading information to display 155; a temperature circuit 139 which provides outdoor and indoor temperatures to display 155 located above the mirror; a keyless entry circuit 144 providing keyless operation information to the display circuit; and to garage door opener circuit 137 to receive garage door opener training signals. The circuit includes a display circuit 127 connected to an instrument dimming panel lead 163a, battery lead 159a, and ground lead 160a. Battery lead 159a and ground lead 160a are the energy source for the display circuit. The intensity of the display source 155 (FIG. 5) is adjusted with the vehicle instrument panel light intensity responsive to a dimmer control (not shown) in the dashboard of vehicle 14. The display circuit includes a vacuum flourescent (156). A display circuit is described in co-pending application Ser. No. 567,390 incorporated herein by reference.

Circuit 103 includes a compass circuit 138 providing vehicle heading information to display circuit 127 via cable 145. The compass circuit is connected to receive energy from battery conductor 159a and ground conductor 160a. Circuit 138 is also connected to fluxgate sensor 102 by conductors 173–176. Examples of compass circuits and fluxgate sensors are found in U.S. Pat. No. 4,505,054 entitled MAGNETIC SENSOR MOUNTING SYSTEM issued to Clark et al on Mar. 19, 1985; U.S. Pat. No. 4,546,551 entitled ELECTRIC CONTROL SYSTEM issued to Franks on Oct. 15, 1985; and U.S. Pat. No. 4,677,381 entitled FLUXGATE SENSOR ELECTRICAL DRIVE METHOD AND CIRCUIT issued to Geerlings on Jun. 30, 1987.

Circuit 103 includes a map/courtesy lamp circuit 136. The map/courtesy lamp circuit 136 is connected to conductors 159a and 160a to receive power from the battery of vehicle 14. The map/courtesy lamp is also connected to courtesy lead 166. The map/courtesy lamp circuit 136 includes lamps 150 and 151 manually controlled by switches 152 and 153. Additionally, map lamps 150 and 151 are controlled by signals on the courtesy lead to turn on and off when the vehicle doors are opened and closed or under the control of a vehicle light control on the vehicle dashboard. The circuit provides auto-off battery saver wherein the vehicle interior lamps are turned off when a courtesy signal occurs while lamps 150 and 151 are on. Circuit 136 also includes slow off lighting after door closure wherein the interior lights of the vehicle dim a predetermined time after the vehicle doors are closed.

Circuit 103 includes a keyless entry circuit 144 which provides interior light control, exterior light control, door lock control, and an alarm for the vehicle. Circuit 144 includes a last door closed locks all the doors which is a microprocessor controlled feature wherein all the doors are locked when the courtesy light is turned off. It also includes programmable rolling locks all doors which is a microprocessor controlled function wherein all the doors of vehicle 14 are locked when the vehicle is placed in drive or reverse and a threshold vehicle speed is reached. Circuit 144 includes a microprocessor controlled theft alarm system. The alarm is armed responsive to keyless entry control signals from the remote keyless transmitter or switch 154 when vehicle 14 is off. The alarm is disarmed by unlocking a vehicle door using a key or the keyless transmitter. The alarm of circuit 144 also includes a panic alert control function wherein the lights of vehicle 14 flash and the horn of vehicle 14 is activated responsive to an alarm alert. A particularly advantageous keyless entry system is disclosed in co-pending application Ser. No. 467,541 entitled VEHICLE SYSTEMS CONTROL, filed Jan. 1, 1990, the disclosure of which is incorporated herein by reference.

Temperature circuit 139 provides exterior and interior temperature information to display circuit 127. The temperature circuit is connected to temperature leads 162a and 163a to receive exterior and interior temperature information from the electrical system of vehicle 14. Temperature circuit is also connected to the battery lead 159a and the ground lead 160a to receive power from vehicle 14. The temperature information is coupled to display 127 via bus 145.

Garage door opener circuit 132 is connected to battery lead 159a and the ground lead 160a to receive power from vehicle 14. The garage door opener circuit is connected via bus 145 to display circuit 127 to inform the vehicle operator that the garage door opener has been trained to a transmitter control signal. A particularly advantageous trainable garage door opener circuit is described in co-pending application Ser. No. 567,390, the disclosure of which is incorporated herein by reference.

Electrically adjustable mirror circuit 131 controls the reflectivity of mirror 125. The circuit includes photo cells (not shown) for sensing the ambient light on the front and rear sides of mirror assembly 16. Circuit 131 is connected via bus 145 to display circuit 127 to provide information to the vehicle operator concerning the operation of the mirror. A mirror reflectivity control is described in co-pending application Ser. No. 567,390, the disclosure of which is incorporated herein by reference.

Warning indicator circuit 137 is connected to lead 161a to receive control signals from vehicle control microprocessor 181. Lead 161a is most preferably a multiplex lead on which battery, alternator, oil pressure and water temperature warning signals are coupled to indicator circuit 137. The indicator circuit alternatively connect to a conductor which provides information to the vehicle operator through a discrete signal conductor. Circuit 137 is connected to display circuit 127 via bus 145 to provide display control signals responsive to which display 127 provides a visual warning to the vehicle operator.

Figure 8:
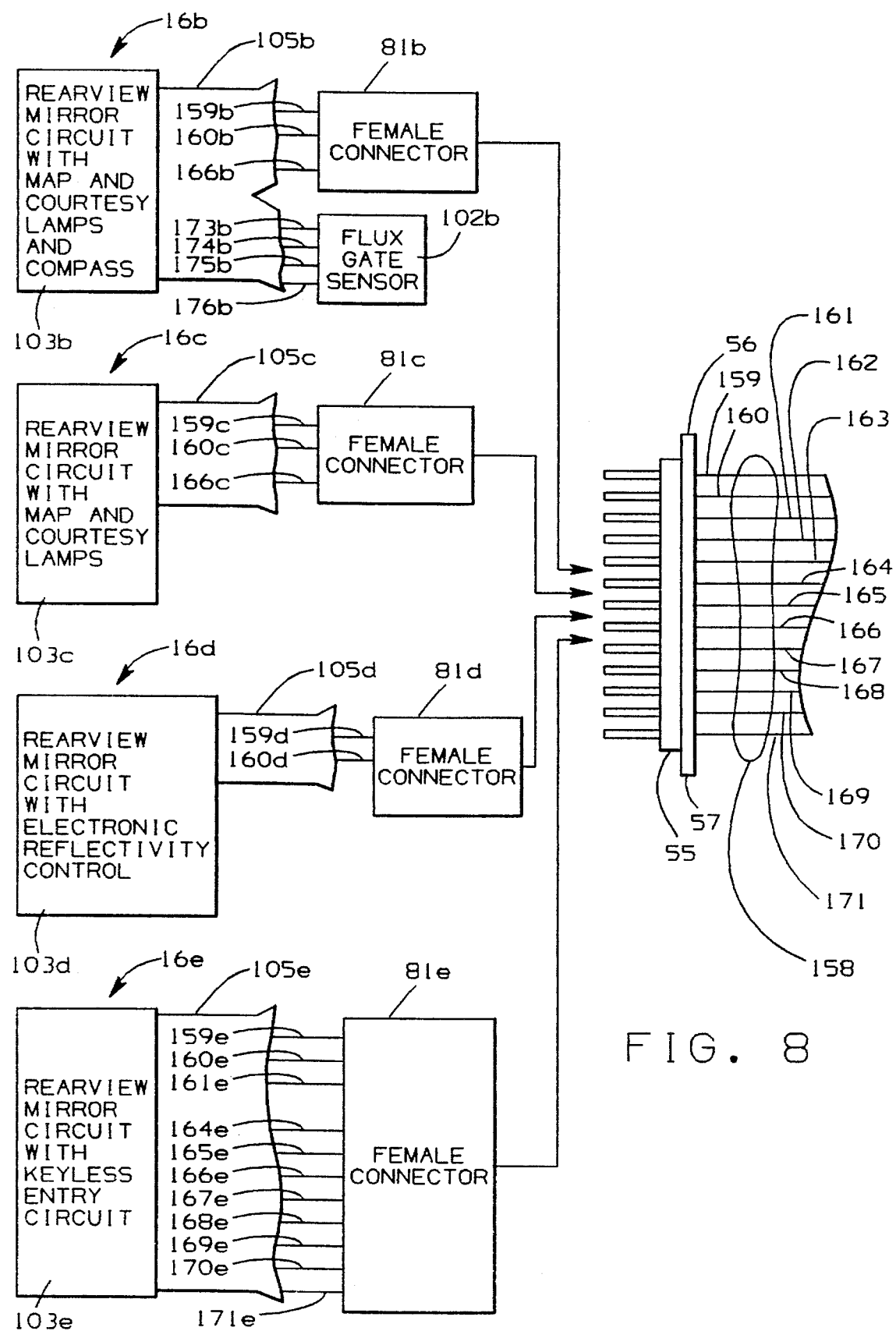
FIG. 8 is an electrical circuit diagram partially in block and schematic form illustrating a few of the plurality of different mirror circuit options available with the system of the present invention.

Referring now to FIG. 8, mirror assembly 16 may include any combination of electrical accessories connected to connector 56 in base 11. Of course, the mirror assembly 16 may be a base mirror having no electrical accessories, in which case mirror support 15 does not include cable 105 or connector 81. A base mirror is mechanically connected to base 11 by base connector 44.

Mirror assembly 16e includes only a keyless entry receiver in control circuit 103e. The circuit in this mirror assembly is connected to female connector 81e by battery conductor 159e, ground conductor 160e, ignition conductor 161e, headlight conductor 164e, headlight off conductor 165e, courtesy conductor 166e, courtesy conductor 167e, trunk release conductor 168e, driver door unlock conductor 169e, lock all doors conductor 170e, and unlock all door conductors 171e connected between rearview mirror circuit 103e and female connector 81e.

Mirror assembly 16c includes only courtesy/entry lamps in circuit 103c. This mirror has a battery conductor 159c, a ground conductor 160c and a courtesy conductor 166c connected between rearview mirror circuit 103c and female connector 81c for electrical connection with male connector 56. Mirror assembly 16d includes only an electric reflectivity control in circuit 103d. Circuit 103d is electrically connected to female connector 81d by a battery conductor 159d and a ground conductor 160d. Mirror circuit 103b in mirror assembly 16b includes only a compass and courtesy/map lamps. This mirror assembly is connected by a battery conductor 159b, a ground conductor 160b and a courtesy conductor 166b to female connector 81b and conductors 173b–176b to fluxgate sensor 102b.

One of mirror assemblies 16 and 16b–16e is plugged into base 11. The mirror assembly attached to base 11 may include any one or more of the electrical accessories listed above. Only those conductors 159–171 having signals necessary to the operation of the electrical circuit 103 and 103b–103e in the respective mirror assemblies 16 and 16b–16e are connected between connector 81 and circuit 103. As illustrated in FIGS. 6 and 8, male connector 56 is connectable to each of the female connector 81 and 81b–81e regardless of the number of electrical accessories in the mirror assemblies. However, only one of assemblies 16 and 16–16e and mirror support 15 is connected to base 11 at a time. The assembly and mirror support 15 received in base 11 and connected to the vehicle electrical system is readily changed after the vehicle is manufactured. By changing the mirror assembly attached to base 11, different electrical accessories are interchangeably provided for the vehicle after the vehicle is manufactured.

Referring now to FIG. 7, the wiring system of some vehicles include multiplex signal conductors 178–179 electrically connected to a vehicle control computer 181*a*. In such a vehicle, a four-wire harness 158*a* includes conductors 177–180 mounted to roof 13 of vehicle 14. The four conductors include a battery conductor 177, a ground conductor 178, an input conductor to computer 181*a* and an output conductor from computer 181*a*. Some vehicles include three conductors (not shown) in the multiplex cable. The conductors in such a multiplex system include a power lead, a ground lead, and an output lead from vehicle microprocessor 181*a*. In such a system, the ground lead is also used as a signal lead for inputting data to vehicle mircroprocessor 181*a*. The vehicle control computer 181*a* includes the following signals: lock doors input from door lock switch; unlock doors input from door lock switch; lock doors output to door locks; unlock doors output to door locks; unlock trunk to output to trunk lock; an oil pressure signal; a water temperature signal; and alternator signal; instrument panel lights dim control signal; head lamp relay driver control signal; vehicle speed; a courtesy signal (interior lamps on/off); battery signal; ground signal; an ignition signal; and a horn relay driver control. The vehicle control computer automatically creates double use of warning lamp wires depending on the status of the vehicle components such as the lights, the door locks and the battery. Computer 181*a* is responsive to discrete input signals and generates multiplexed output signals for controlling the vehicle electrical system.

The four-wire harness 158*a* connects a computer 181*a* to four-pin male connector 56*a*. The rearview mirror assembly circuit 103*a* includes a microprocessor 103' for communicating with computer 181*a* in vehicle 14 through conductors 178*a*, 179*a*, 178 and 179. The mirror microprocessor will also monitor the signals from vehicle computer 181*a* to control the accessories in circuit 103*a*. Circuit 103*a* is connected via conductors 177*a*, 180*a*, 177 and 180 to vehicle battery $V_B$ and vehicle ground. Circuit 103*a* of assembly 16*a* may include any one or more of the electrical accessories described above for mirror assembly 16. An eight-wire cable 105*a* includes conductor 173*a*–176*a* connected between microprocessor 103' to flux gate sensor 102*a* and four conductors 177*a*–180*a* connected between microprocessor circuit 103' and four-terminal connector 81*a* when circuit 103*a* includes a compass circuit. The four conductors 177*a*–180*a* connects circuit 103*a* to connector 81*a* regardless of the electrical accessories in the mirror assembly.

As with the 13 wire harness of FIGS. 6 and 8, mirror assemblies 16*a* and mirror support 15 are assembled including different electrical accessories in the mirror assemblies. A mirror assembly 16*a* is attached to base 11 in a vehicle 14 to connect accessories to the vehicle. Additionally, the accessories may be readily changed by attaching a mirror assembly having different accessories to base 11. Because a four-wire harness is utilized in a vehicle having a multiplex signalling arrangement, the cost of providing mounting harness 158*a* is relatively low. Accordingly, a significant cost penalty is not incurred when a base mirror having no electrical options is attached to base 11.

To attach the mirror support 15 and rearview assembly 16 illustrated in FIG. 5 to base 11, base connector 44 of mirror support 15 is inserted into pocket 19. Projecting fingers 49, 50 are inserted through aperture 45, and clip 91 and female connector 81 are inserted into pocket 19. Clip 91 receives cylinder 52. Pins 185–197 of male connector 56 are plugged into female connector 81 or pins 198–201 of connector 56*a* are plugged into base connector 81*a*. The top wall 38 of pocket 20 fits snugly between fingers 49, 50 and sidewalls 70, 71. The clip requires a predetermined force to spread arms 142 and 143 in order for clip 91 to receive and release cylinder 52. Furthermore, the force required to remove clip 91 from cylinder 52 determines the force required to remove mirror support 15 from base 11. The force required to remove mirror support 15 from base 11 is such that manipulation of mirror assembly 16 to adjust the position of the rearview mirror or manipulation of the control buttons on mirror assembly 16 will not cause the base connector portion 44 of mirror 16 to be removed from base 11. On the other hand, when a force is exerted on the mirror by a person impacting the mirror or by a person intentionally attempting to remove mirror support 15 from base 11, mirror support 15 separates from the base.

Thus, it can be seen that a rearview mirror mounting assembly is disclosed which provides versatile connection of mirror support carrying a mirror assembly to a base. Additionally, the interconnection of the stem provides a breakaway connection of the mirror such that impact during an accident causes separation of the mirror and stem from the base without causing damage to the base or the mirror support. The removable mounting arrangement permits a dealer to change the mirror assembly attached to the vehicle after the vehicle is manufactured whereby a purchaser of a vehicle may select the electrical accessories which a purchaser they desire for a particular vehicle.

Various modifications to the preferred embodiment of the invention described herein can be made by those skilled in the art without departing from the spirit or scope of the invention as defined by the appended claims.

The embodiments of the invention in which an exclusive property or privilege is claimed are defined as follows.

What is claimed is:

1. An overhead breakaway mirror mount for a vehicle including a roof structure comprising:

a base carried on the vehicle roof structure;

a mirror assembly including a mirror housing and an electrical accessory carried therein;

a support member for said mirror housing, said support member including first and second ends, means at said first end of said support member for mounting said mirror housing to said support member; and said support member including means for mechanically releasably coupling said second end of said support member to said base and means coupled to said electrical accessory for releasably electrically coupling said electrical accessory to conductors in the vehicle's roof structure, said electrical coupling means carried on said second end of said support member, whereby an impact force will cause said support member to disengage said base and said electrical coupling means to disconnect from said conductors in the roof structure, wherein said support member includes a first pair of slots formed on a rearward edge of said support for receiving a mechanical connecting means on said base.

2. An overhead breakaway accessory mount for a vehicle comprising:

a base carried on the vehicle roof, said base including a mechanical connector and an electrical connector coupled to wiring in the vehicle roof;

an accessory for mounting to a vehicle;

a support member for said accessory, said support member having first and second ends and means at said first end of said support member for mounting said accessory to said support member, said support member including a first pair of slots formed on said second end of said support member for receiving said mechanical connector on said base, and said support member including a resilient clip aligned with said slots, wherein said clip receives said mechanical connector on said base and said support member including mechanically releasably coupling an opposite end of said means electrically coupled to said accessory for releasably coupling to said electrical connector, said electrical coupling means on said second end of said support member whereby an impact force will cause said support member to disengage said base and said electrical connector.

3. The breakaway mirror mount as defined in claim 2 wherein said clip is coupled to said support by a pair of fasteners.

4. A rearview mirror mounting assembly for a vehicle including a roof structure, comprising:

a base carried on the vehicle roof structure, said base including first mechanical coupling means, having a first end and a second end, and first electrical coupling means connected to wiring in the vehicle roof;

a rearview mirror assembly having an electrical option therein; and a support means attached to said mirror assembly and including second mechanical coupling means having first and second ends for removably mounting said support means to said first mechanical coupling means, said support means including second electrical coupling means for removably electrically coupling said rearview mirror assembly to said first electrical coupling means, said first and second mechanical coupling means each including connectors on said first and second ends which are interconnected whereby said rearview mirror assembly is securely, releasably attached to the vehicle roof structure and said electrical option is releasably electrically coupled to the vehicle electrical system, and wherein said support-means includes a first pair of slots formed on a rearward edge for receiving a mechanical connecting means on said base.

5. The rearview mirror mounting member as defined in claim 4 wherein said support means include a second pair of slots spaced from said first pair of slots which receive a at least a portion of said base.

6. A rearview mirror mounting assembly for a vehicle including an electrical system comprising:

a base adapted to be attached to the vehicle, said base including a first mechanical coupling means and an electrical coupling means carried by said base;

a rearview mirror assembly having at least one of a plurality of different electrical options therein; and a support means attached to said mirror assembly and including means for removably mounting said support means to said first mechanical coupling means on said base, said support means including electrical coupling means for removably electrically coupling said rearview mirror assembly to said electrical coupling means carried by said base, said support means adapted to be removably attached to said base whereby said rearview mirror assembly having said at least one of said plurality of different electrical options may be attached to and removed from said base, said removable mounting means on said support means including a second mechanical coupling means wherein one of said first and second mechanical coupling means includes a first pair of slots for receiving the other one of said mechanical coupling means and a clip for receiving said other one of said first and second mechanical coupling means when said slots receive said other one of said first and second mechanical coupling means carried by said base.

7. The rearview mirror mounting assembly as defined in claim 6 wherein said clip is coupled to said support by a pair of fasteners.

8. An overhead breakaway mirror mount for a vehicle including a roof structure comprising:

a base carried on the vehicle roof structure;

a mirror assembly including a mirror housing and an electrical accessory carried therein;

a support member for said mirror housing, said support member including first and second ends, means at said first end of said support member for mounting said mirror housing to said support member said second end having a forward and rearward portion; and said support member including means for mechanically releasably coupling said second end of said support member to said base and means coupled to said electrical accessory for releasably electrically coupling said electrical accessory to conductors in the vehicle's roof structure, said electrical coupling means carried on said second end of said support member, whereby a forward impact force to said mirror assembly will cause said support member to disengage said base and said electrical coupling means to disconnect from said conductors in the roof structure, wherein said support member includes at least one substantially "C"-shaped slot formed on the rearward portion of said support and having an opening at a rearmost end of said slot for receiving a mechanical connecting means on said base.

* * * * *

UNITED STATES PATENT AND TRADEMARK OFFICE
CERTIFICATE OF CORRECTION

PATENT NO. : 5,455,716
DATED : October 3, 1995
INVENTOR(S) : Michael J. Suman et al.

It is certified that error appears in the above-indentified patent and that said Letters Patent is hereby corrected as shown below:

Column 11, Claim 2, lines 8 & 9;

Delete "mechanically releasably coupling an opposite end of said".

Column 11, Claim 5, line 46;

"receive a at" should be --receives at--.

Signed and Sealed this

Twenty-fifth Day of June, 1996

*Attest:*

BRUCE LEHMAN

*Attesting Officer*  *Commissioner of Patents and Trademarks*